(12) United States Patent
Estelle et al.

(10) Patent No.: US 8,938,400 B2
(45) Date of Patent: Jan. 20, 2015

(54) APPARATUS, SYSTEM, AND METHOD FOR CHECKING THE HEALTH OF ENCRYPTION KEY MANAGERS

(75) Inventors: Daniel Charles Estelle, Tucson, AZ (US); Scott W. Griffith, Tucson, AZ (US); Noah J. Sellars, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1948 days.

(21) Appl. No.: 11/613,901

(22) Filed: Dec. 20, 2006

(65) Prior Publication Data

US 2008/0152143 A1 Jun. 26, 2008

(51) Int. Cl.
*G06Q 10/00* (2012.01)

(52) U.S. Cl.
USPC ............... 705/50; 705/1.1; 705/71; 702/108

(58) Field of Classification Search
USPC ............................................ 705/50–59
See application file for complete search history.

(56) References Cited

U.S. PATENT DOCUMENTS

| 4,467,421 | A | * | 8/1984 | White | 711/118 |
| 4,638,424 | A | * | 1/1987 | Beglin et al. | 711/117 |
| 6,618,360 | B1 | * | 9/2003 | Scoville et al. | 370/248 |
| 6,707,914 | B1 | | 3/2004 | Bell | 380/46 |

| 2002/0094089 | A1 | | 7/2002 | Kamiya et al. | 380/279 |
| 2006/0085343 | A1 | | 4/2006 | Lisanke et al. | 705/50 |
| 2006/0149675 | A1 | | 7/2006 | Kawamoto et al. | 705/50 |
| 2007/0113104 | A1 | * | 5/2007 | Witt et al. | 713/193 |

FOREIGN PATENT DOCUMENTS

| CN | 1606269 | 4/2005 | |
| CN | 1937489 | 3/2007 | |
| GB | 2 293 737 | 9/1995 | H04L 9/30 |
| JP | 2003208356 | 7/2003 | G06F 12/14 |
| JP | 2004334392 | 11/2004 | G06F 1/00 |
| WO | WO2006045102 | 4/2006 | H04L 9/28 |

OTHER PUBLICATIONS

Office Action from China dated May 31, 2010.

* cited by examiner

*Primary Examiner* — Calvin Loyd Hewitt, II
*Assistant Examiner* — Cristina Owen Sherr
(74) *Attorney, Agent, or Firm* — Kunzler Law Group

(57) ABSTRACT

An apparatus, system, and method are disclosed for checking the health of encryption key managers (EKM). An identification module identifies an EKM of a plurality of EKMs. A communication module establishes communication with the EKM. A request module requests an encryption key from the EKM. A verification module verifies that there is a valid encryption key path to the EKM. In one embodiment, the verification module validates that the EKM can exchange encryption keys with a tape drive. The verification module may also validate that the EKM can certify the authenticity of a tape drive.

20 Claims, 5 Drawing Sheets

APPARATUS, SYSTEM, AND METHOD FOR CHECKING THE HEALTH OF ENCRYPTION KEY MANAGERS

BACKGROUND OF THE INVENTION

1. Field of the Invention

This invention relates to an encryption key manager (EKM) and more particularly relates to checking the health of an EKM.

2. Description of the Related Art

Data processing systems often encrypt data when the data is written to a storage device. For example, a data processing system may encrypt data written to a magnetic tape. If the magnetic tape subsequently falls into the hands of a malicious user, the encrypted data is protected and may not be read by the malicious user.

The data processing system typically encrypts data with an encryption key. An encryption key may be a random number with a specified number of digits. Applying the encryption key to the data using a specified algorithm may encrypt data. The data may be decrypted into a recognizable form by using the encryption key and reversing the specified algorithm.

The data processing system may employ one or more EKMs to provide encryption keys for encrypting data. The plurality of EKMs may assure that an EKM is available to provide an encryption key when needed. In addition, EKMs may be distributed through the data processing system to reduce the latency for receiving an encryption key.

The encryption keys are obtained to encrypt and protect data only if the data processing system can establish communications with an EKM. In addition, each EKM must be able to provide encryption keys of a specified type. If the data processing system cannot communicate with an EKM and/or if the EKM cannot provide encryption keys of a specified type, then the data may be stored to a storage device unprotected.

Unfortunately, there is no convenient way for an administrator to verify that EKMs can be communicated with and can provide an encryption key of a specified type. As a result, the administrator may be uncertain if data is properly protected.

SUMMARY OF THE INVENTION

From the foregoing discussion, there is a need for an apparatus, system, and method that check the health of EKMs. Beneficially, such an apparatus, system, and method would allow an administrator to conveniently check the functionality of a plurality of EKMs.

The present invention has been developed in response to the present state of the art, and in particular, in response to the problems and needs in the art that have not yet been fully solved by currently available EKM health checking methods. Accordingly, the present invention has been developed to provide an apparatus, system, and method for checking the health of EKMs that overcome many or all of the above-discussed shortcomings in the art.

The apparatus to check the health of EKMs is provided with a plurality of modules configured to functionally execute the steps of identifying an EKM, establishing communication with the EKM, requesting an encryption key from the EKM, and verifying that there is a valid encryption key path to the EKM. These modules in the described embodiments include an identification module, a communication module, a request module, and a verification module. The apparatus may also include a report module.

The identification module identifies an EKM of a plurality of EKMs. The communication module establishes a valid communication path with the EKM. The request module requests an encryption key from the EKM. The request module may also validate that the EKM can certify the authenticity of a tape drive The verification module verifies that there is a valid encryption key path to the EKM. In one embodiment, the verification module validates that the EKM can exchange encryption keys with a tape drive.

In one embodiment, the report module generates a health check report with a status of each of the plurality of EKMs. The apparatus checks the health of the EKMs, assuring that EKMs can communicate with and can share encryption keys with the Tape Drive.

A system of the present invention is also presented to check the health of EKMs. The system may be embodied in a data processing system. In particular, the system, in one embodiment, includes a plurality of tape drives, a plurality of EKMs, and a host.

The magnetic tape drives are configured to store data including data encrypted with an encryption key. The EKMs are configured to provide the encryption keys. The host is in communication with the magnetic tape drives and the EKMs. In addition, the host includes an identification module, a communication module, a request module, a verification module, and a report module.

The identification module identifies each EKM of a plurality of EKMs. The communication module establishes communication with each EKM. The request module requests an encryption key from each EKM. The verification module verifies that there is a valid encryption key path to each EKM. The report module generates a health check report with a status of each of the plurality of EKMs. The system checks that the EKMs can provide valid encryption keys to the magnetic tape drives.

A method of the present invention is also presented for checking the health of EKMs. The method in the disclosed embodiments substantially includes the steps to carry out the functions presented above with respect to the operation of the described apparatus and system. In one embodiment, the method includes identifying an EKM, establishing communication with the EKM, requesting an encryption key from the EKM, and verifying that there is a valid encryption key path to the EKM.

An identification module identifies an EKM of a plurality of EKMs. A communication module establishes communication with the EKM. A request module requests an encryption key from the EKM. A verification module verifies that there is a valid encryption key path to the EKM. In one embodiment, the verification module validates that the EKM can exchange encryption keys with a tape drive. The verification module may also validate that the EKM can certify the authenticity of a tape drive. The method validates that the EKMs can provide encryption keys for data storage.

References throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention checks the health of EKMs. By checking the health of the EKMs, the present invention demonstrates that the EKMs can provide valid encryption keys for encrypting and protecting data. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
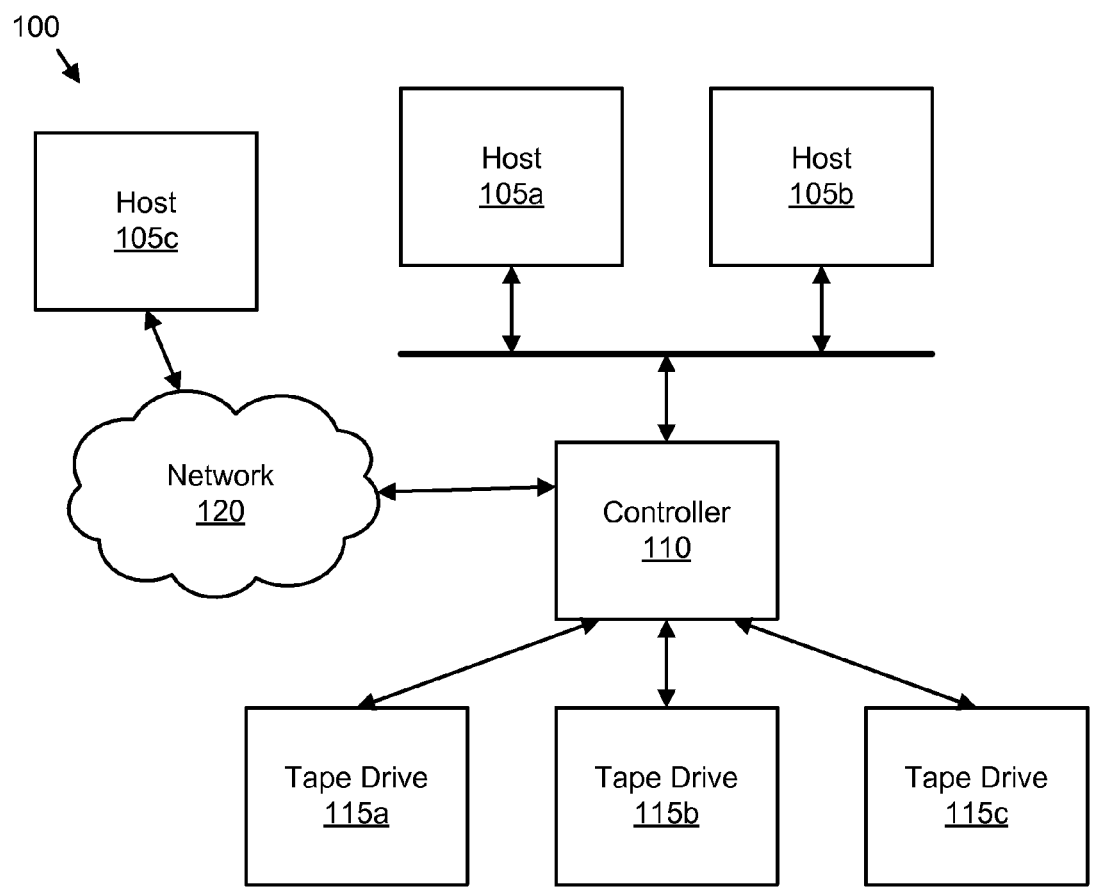
FIG. 1 is a schematic block diagram illustrating one embodiment of a data processing system in accordance with the present invention.

FIG. 1 is a schematic block diagram illustrating one embodiment of a data processing system 100 in accordance with the present invention. The system 100 includes one or more hosts 105, a controller 110, one or more tape drives 115, and a network 120. Although for simplicity the system 100 is shown with three hosts 105, one controller 110, three tape drives 115, and one network 120, any number of hosts 105, controllers 110, magnetic tape drives 115, and networks 120 may be employed. In addition, one of skill in the art will readily recognize that other devices such as optical storage devices, hard disk drives, may also be included in the system 100.

The tape drives 115 store data to and retrieves data from magnetic tapes. The magnetic tapes may store large quantities of data at a low cost. The tape drives 115 may be configured to encrypt and decrypt data.

In one embodiment, the controller 110 manages the tape drives 115. For example, the controller 110 may direct that a specified magnetic tape volume be mounted to a tape drive 115 so that data may be retrieved from the specified magnetic tape volume. Alternatively, the controller 110 may direct that a blank magnetic tape be mounted to a tape drive 115 so that data may be stored to the blank magnetic tape.

The hosts 105 may be mainframe computers, servers, computer workstations, and the like. The hosts 105 may store data to the tape drives 115. For example, a first host 105*a* may store archival data to a magnetic tape mounted on a first tape drive 115*a*. After the data is stored to the magnetic tape, the magnetic tape may be removed from the first tape drive 115*a* for storage.

In one embodiment, the hosts 105 may communicate with the controller 110 through dedicated communication channels. For example, first and second hosts 105*a*, 105*b*, the controller 110, and the tape drives 115 may all reside in a data center and communicate through dedicated fiber optic connections, dedicated electrical connections, and the like. Alternatively, a host 105a may communicate with the controller 110 through a network 120. The network 120 may be the Internet, a wider area network (WAN), and the like.

Unfortunately, the magnetic tape may also come into the possession of a malicious and/or unauthorized user. As a result, the tape drives 115 may encrypt stored data with an encryption key to protect the stored data. The tape drives 115 may employ the encryption key with one or more specified algorithms to encrypt data. A host 105, tape drives 115, and/or the controller 110 may retain the encryption key so that when data is retrieved from the magnetic tape, the encrypted data may be decrypted.

The tape drives 115 receive encryption keys from an encryption key manager (EKM) as will be described hereafter. In order for the tape drives 115 to securely encrypt data, the tape drives 115 must be able to receive a valid encryption key when data needs to be encrypted. The present invention checks the health of EKMs to assure that valid encryption keys are available as needed as will be described hereafter.

Figure 2:
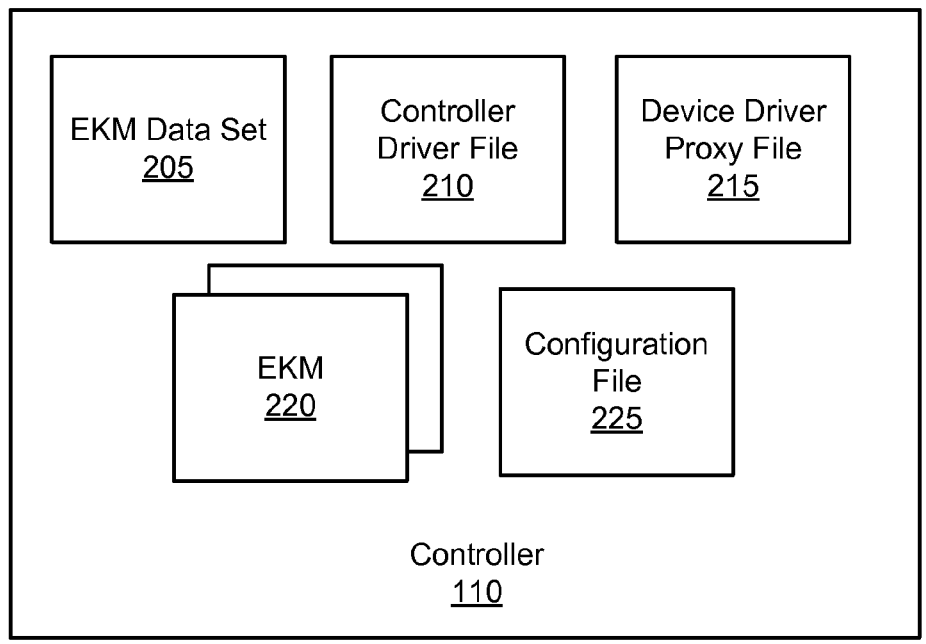
FIG. 2 is a schematic block diagram illustrating one embodiment of a controller of the present invention.

FIG. 2 is a schematic block diagram illustrating one embodiment of a controller 110 of the present invention. The controller 110 is the controller 110 of FIG. 1. The description of the controller 110 refers to elements of FIG. 1, like numbers referring to like elements. The controller 110 includes an EKM data set, a controller driver file 210, device driver proxy file 215, one or more EKMs 220, and a configuration file 225. Although for simplicity two EKMs 220 are shown, any number of EKMs 220 may be employed. In addition, EKMs 220 may reside on other devices such as the host 105. In one embodiment, up to sixty-four (64) may reside within the system 100.

Each EKM 220 is configured to generate one or more encryption keys. In one embodiment, each EKM 220 may include a random number generator. For example, the EKM 220 may generate a one hundred twenty-eight (128) digit random number for use as an encryption key. Each EKM 220 may also certify the authenticity of a tape drive 115. For example, an EKM 220 may certify that the first tape drive 115a is a trusted encryption capable drive.

The EKM data set 205 stores a record of each EKM 220 in the system 100. In one embodiment, the EKM data set 205 records an identifier such as an alias name and an Internet protocol (IP) address for each EKM 220 as will be described hereafter.

The configuration file 225 stores information for configuring communications with EKMs 220. For example, a tape drive 115 may address an EKM 220 with the EKM's identifier, and the configuration file 225 may generate an address for the EKM 220 from the identifier. The controller driver file 210 and device driver proxy file 215 are each examples of configuration files 225.

The controller driver file 210 is one embodiment of a configuration file 225. The controller driver file 210 lists one or more drivers that manage communications between the hosts 105 and the controller 110. The controller driver file 210 may list one or more EKMs 220. For example, the controller driver file 210 may include a plurality of EKM identifiers, a plurality of EKM addresses, and the like. A tape drive 115 may communicate with an EKM 220 by addressing communications to an identifier of the EKM 220. The controller driver file 210 may route the communication to the EKM 210. In one embodiment, the controller driver file 210 is a FICON file that lists drivers for fiber optic connections between the hosts 105 and the controller 110 over an Enterprise Systems Connection (ESCON) optical serial interface produced by International Business Machines Corporation (IBM) of Armonk, N.Y.

The device driver proxy file 215 is an alternate embodiment of the configuration file 225. The device driver proxy file 215 is configured to convert commands from a host 105 to commands for a tape drive 115. For example, the device driver proxy file 215 may be configured as a microcode translation table that translates each host command into a corresponding tape drive command and each tape drive command into a corresponding host command.

In one embodiment, a tape drive 115 requests an encryption key from an EKM 220 by issuing a command that accesses the device driver proxy file 215. The device driver proxy file 215 may retrieve the address for an EKM 220 from the device driver proxy file 215 in response to the command, and the command is forwarded to the EKM 220. The device driver proxy file 215 may include an identifier and/or an address for each EKM 220. In a certain embodiment, the device driver proxy file 215 is a Fibre Channel (FC) proxy file.

Figure 3:
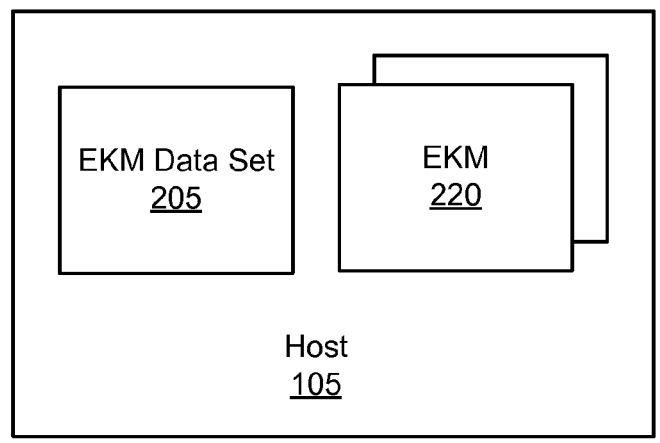
FIG. 3 is a schematic block diagram illustrating one embodiment of a host of the present invention.

FIG. 3 is a schematic block diagram illustrating one embodiment of a host 105 of the present invention. The description of the host 105 refers to elements of FIGS. 1-2, like numbers referring to like elements. The host includes the EKM data set 205 and one or more EKMs 220 as described above.

Figure 4:
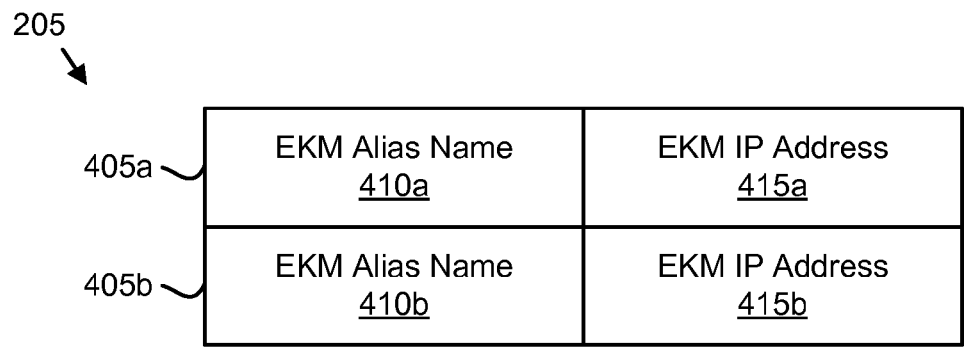
FIG. 4 is a schematic block diagram illustrating one embodiment of an EKM data set of the present invention.

In one embodiment, a single EKM data set 205 resides on either the controller 110 or on a host 105. Alternatively, a plurality of EKM data sets 205 may be distributed throughout the system 100. The EKMs 220 may also be distributed throughout the system FIG. 4 is a schematic block diagram illustrating one embodiment of an EKM data set 205 of the present invention. The EKM data set 205 may reside on a host 105, a controller 110, or the like within the system 100.

The EKM data set 205 includes one or more EKM records 405. For simplicity only two EKM records 405 are shown. However, one of skill in the art will recognize that any number of EKM records 405 may be employed.

Each EKM record 405 includes an EKM alias name 410 and an EKM IP address 415. The EKM alias name 410 and the EKM IP address 415 may be data fields. One of skill in the art will recognize that each EKM record 405 may include other data fields. The EKM alias name 410 and the EKM IP address 415 may also be delimited portions of a flat data file, linked data structures, or the like.

The EKM alias name 410 identifies an EKM 220. In one embodiment, the EKM alias name 410 is an identifier. For example, a tape drive 115 may request an encryption key using the EKM alias name 410.

The EKM IP address 415 may be a physical and/or logical address for an EKM 220. In one embodiment, a request for an encryption key directed to an EKM alias name 410 is translated into the EKM IP address 415 and communicated to the EKM IP address 415.

Figure 5:
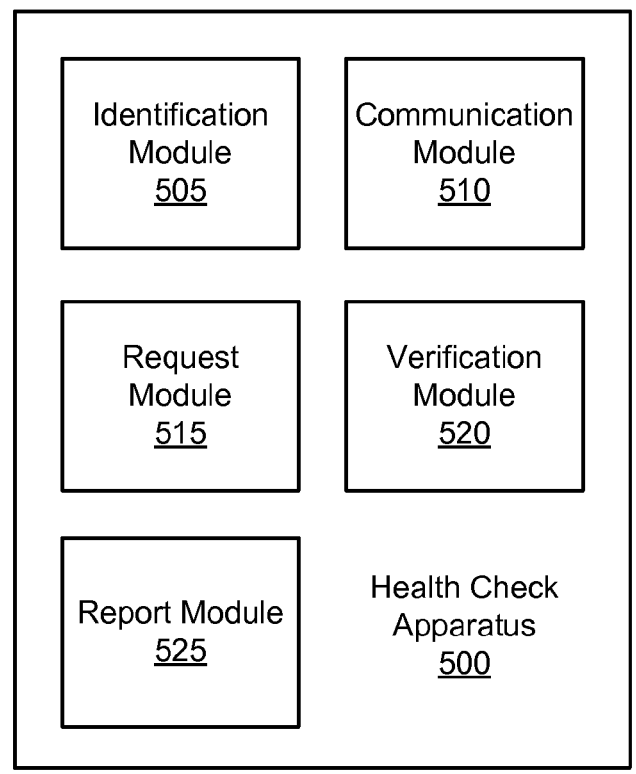
FIG. 5 is a schematic block diagram illustrating one embodiment of a health check apparatus of the present invention.

FIG. 5 is a schematic block diagram illustrating one embodiment of a health check apparatus 500 of the present invention. The description of the apparatus 500 refers to elements of FIGS. 1-4, like numbers referring to like elements. The apparatus 500 may be embodied in a host 105. In one embodiment, the host 105 may communicate with the controller 110 and the tape drives 115 through dedicated communication channels. Alternatively, the host 105 may be sited remotely from the controller 110 and the tape drives 115 and communicate with the controller 120 through the network 120.

The apparatus 500 includes an identification module 505, a communication module 510, a request module 515, a verification module 520, and a report module 525. The identification module 505, communication module 510, request module 515, verification module 520, and report module 520 may each be configured as portions of one or more computer readable programs that execute on a host 105.

The identification module 505 identifies an EKM 220 of a plurality of EKMs 220. The communication module 510 establishes communication with the EKM 220. The request module 515 requests an encryption key from the EKM 220.

The verification module 520 verifies that there is a valid encryption key path to the EKM 220. In one embodiment, the verification module 520 validates that the EKM 220 can exchange encryption keys with a tape drive 115. The verification module 520 may also validate that the EKM 220 can certify an authenticity of a tape drive 115 as will be described hereafter.

In one embodiment, the report module 525 generates a health check report with a status of each of the plurality of EKMs 220. The apparatus 500 checks the health of the EKMs 220, assuring that the EKMs 220 can generate encryption keys for the tape drives 115.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
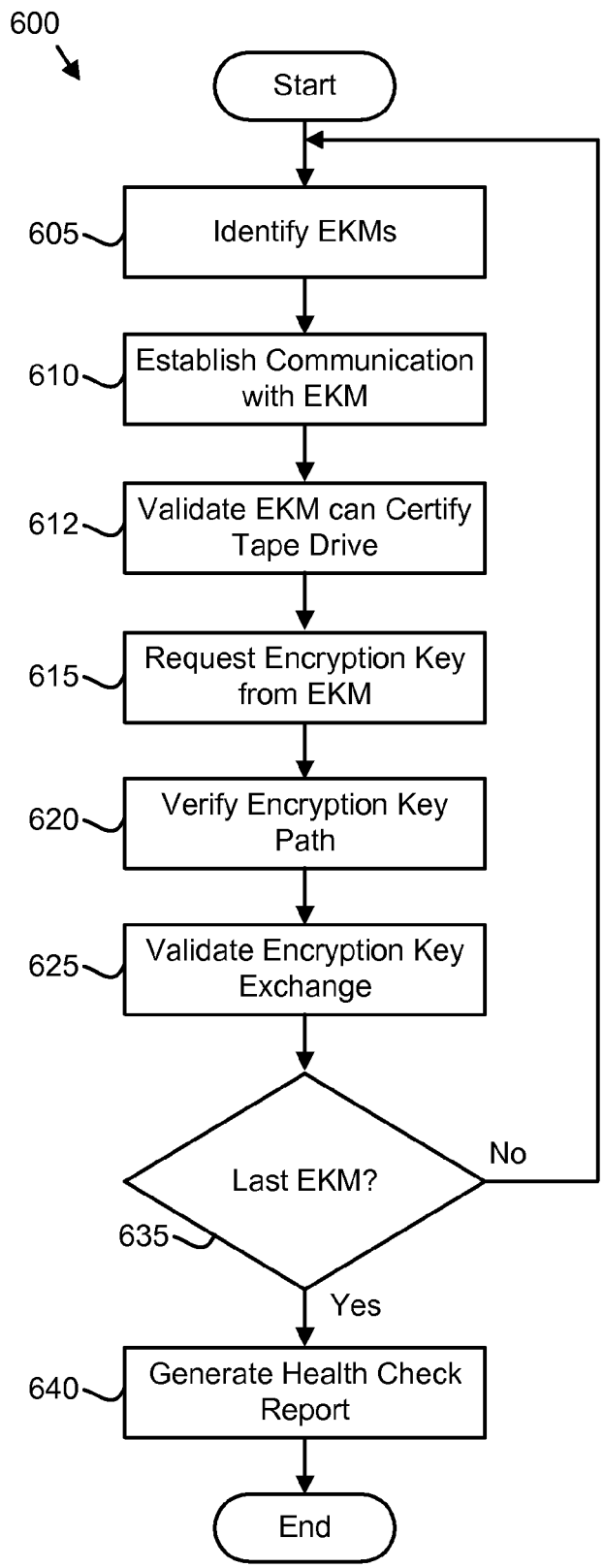
FIG. 6 is a schematic flow chart diagram illustrating one embodiment of a health check method of the present invention.

FIG. 6 is a schematic flow chart diagram illustrating one embodiment of a health check method 600 of the present invention. The method 600 substantially includes the steps to carry out the functions presented above with respect to the operation of the described apparatus and system of FIGS. 1-5.

The description of the method 600 refers to elements of FIGS. 1-5, like numbers referring to like elements. In one embodiment, the method 600 is implemented with a computer program product comprising a computer readable medium having a computer readable program. A host 105 may execute the computer readable program. Alternatively, the controller 110 may execute the computer readable program.

The method 600 begins and the identification module 505 identifies 605 an EKM 220 of a plurality of EKMs 220. In one embodiment, the identification module 505 identifies 605 the EKM 220 by reading an EKM alias name 420 and an EKM IP address 415 for the EKM 220 from the EKM data set 205.

The communication module 510 establishes 610 communications with the EKM 220. In one embodiment, the communication module 510 establishes communication with the EKM 220 by modifying the configuration file 225 with a new entry for the EKM 220 comprising the alias name and IP address of the specified EKM 220. For example, the configuration file 225 may direct requests for encryption keys to a first listed EKM 220 listed in the configuration file 225. The communication module 510 may modify the configuration file 225 so that the EKM 220 is the first listed EKM 220. As a result, a request for an encryption key is directed to the EKM 220.

In one embodiment, the communication module 510 pings the EKM 220 as is well known to those of skill in the art. If the communication module 510 receives a response from the EKM 220, the communication module 510 may communicate through a firewall to the EKM 220.

The verification module 520 may validate 612 that the EKM 220 can certify the authenticity of a tape drive 115. In one embodiment, the verification module 520 directs the EKM 220 to certify the tape drive 115 is a trusted encryption drive by validating a unique certificate provided the tape drive 115.

The request module 515 requests 615 an encryption key from the EKM 220. In one embodiment, the request module 515 requests 615 the encryption key by simulating a tape drive 115. For example, the request module 515 may create a tape drive address and identifier and map the tape drive address and identifier to a logical address of the request module 515. Thus the specified EKM 220 sees a tape drive 115 when communicating with the request module 515. The request module 515 may further request 615 an encryption key from the specified EKM 220 as though the request module 515 was a tape drive 515.

In an alternate embodiment, the request module 515 may direct the controller 110 to have a scratch magnetic tape volume loaded to a tape drive 115. The scratch magnetic tape volume is referred to herein as a scratch volume. The loading of the scratch volume may prompt the tape drive 115 to request 615 an encryption key from the EKM 220.

The verification module 520 verifies 620 that there is a valid encryption key path to the specified EKM 220. In one embodiment, the verification module 520 verifies 620 that there is a valid encryption key path to the specified EKM 220 if the verification module 520 receives a valid encryption key from the specified EKM 220. The verification module 520 may also verify that the valid encryption key path is properly configured such as with firewall exceptions, software prerequisites, and the like.

Alternatively, the verification module 520 may verify 620 that there is a valid encryption key path if the tape drive 115 mounting the scratch volume receives a valid encryption key from the specified EKM 220. The verification module 520 may monitor communications to the tape drive 115 mounting the scratch volume to verify that the tape drive 115 receives the encryption key.

In one embodiment, the verification module 520 validates 625 that the EKM can exchange encryption keys with the tape drive 115. For example if the verification module 520 and/or tape drive 115 and the EKM 220 possess the valid encryption key, then the EKM 220 can exchange encryption keys with the tape drive 115. In one embodiment, the verification module 520 queries the tape drive 115 for the encryption key to determine that the tape drive 115 has the encryption key.

In one embodiment, the verification module 520 determines 635 if a last EKM 220 of the plurality of EKMs 220 is verified. If the last EKM has not been verified, the identification module 505 identifies 605 another EKM 220 of a plurality of EKMs 220.

If the verification module 520 determines 635 that the last EKM 220 is verified, the report module 525 may generate 640 a health check report with a status of each of the plurality of EKMs 220 and the method 600 terminates. In one embodiment, the health check report lists each EKM 220 in the system 100, along with the status for each EKM 220 as will be described hereafter. The method 600 checks the health of the EKMs 220, assuring that EKMs 220 can generate encryption keys for the tape drives 115. Thus an administrator may easily determine if the EKMs 220 of a system 100 are functional. In addition, the method 600 may validate the encryption keys and validate that each EKM 220 can certify the authenticity of tape drives 115.

Figure 7:
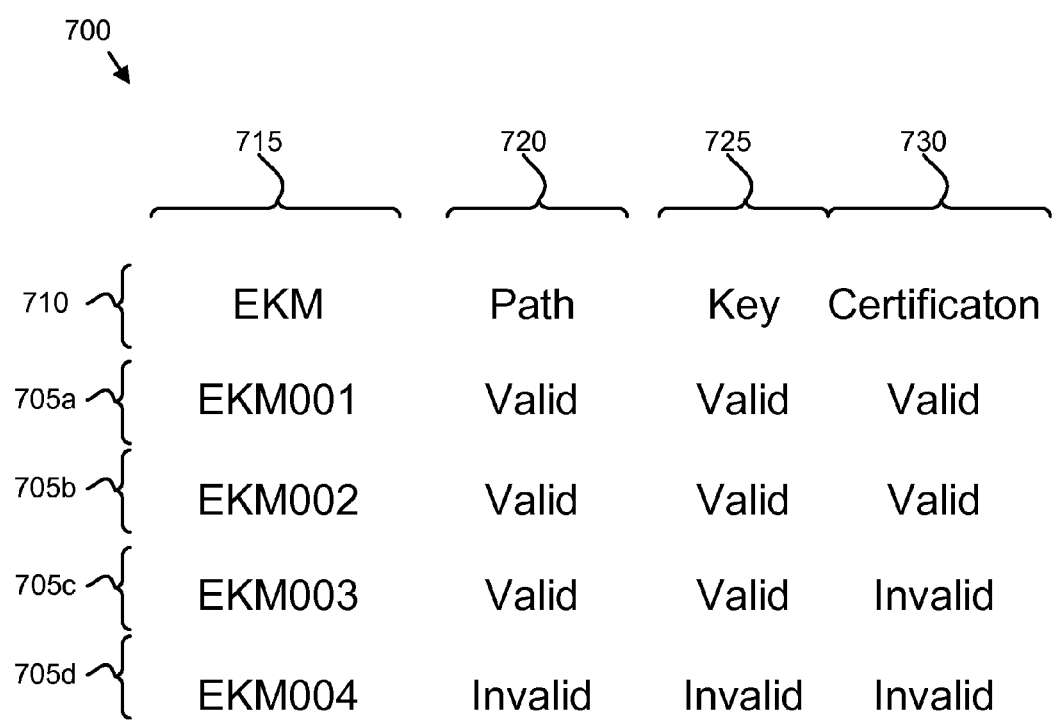
FIG. 7 is a text diagram illustrating one embodiment of a health check report of the present invention.

FIG. 7 is a text diagram illustrating one embodiment of a health check report 700 of the present invention. The report module 525 may generate 640 the report 700 as described for step 640 of FIG. 6. Description of the report 700 refers to elements of FIGS. 1-6, like numbers referring to like elements. The report 700 illustrates data for each EKM 220 organized by rows. However, the report may be organized in other formats as is well known to those of skill in the art.

In one embodiment, the report 700 includes one or more headers 710. Each header 710 may describe the type of data listed in the same column as the header 710. As depicted, the report 700 includes an EKM header for an EKM column 715, a path header for a path column 720, a key header for a key column 725, and a certification header for a certification column 730. One of skill in the art will readily recognize that additional columns may be employed.

One or more EKM rows 705 detail the status of each EKM 220. The report 700 is depicted with four (4) rows 705, although the report 700 may include any number of rows 705. Each EKM 220 being reported on may be listed in the EKM column 715 by an identifier. For example, a second EKM row 705b is for an EKM 220 with an identifier "EKM001."

In one embodiment, the path column 720 specifies if the path to the EKM is valid. For example, the path column 720 for a first EKM row 705a indicates that a path to an EKM 220 with an identifier "EKM001" is valid. Thus a tape drive 115 may receive an encryption key from EKM 220 of the first EKM row 705a. The path column 720 for a fourth EKM row 705d indicates that a path to an EKM 220 with an identifier "EKM004" is invalid, indicating that a tape drive 115 could not receive an encryption key from that EKM 220.

In one embodiment, the key column 725 specifies if an encryption key received from the EKM 220 of the EKM row 705 is valid. For example, if the verification module 520 validates 625 an encryption key from the EKM 220 of the second EKM row 705b, the key column 725 of the second EKM row 705b indicates that the encryption key is valid as shown.

The certification column 730 may specify if the EKM 220 of an EKM row 705 is able to certify a tape drive 115. For example, if the verification module 520 does not validate that an EKM 220 of a third EKM row 705c can certify a tape drive 115, the certification column 730 may indicate that the EKM's ability to certify a tape drive 115 is invalid as shown.

The present invention checks the health of EKMs 220. In addition, the present invention may report whether the EKMs 220 can provide valid encryption keys for encrypting data. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to check the health of encryption key managers (EKM), the apparatus comprising:
   a controller distinct from a plurality of tape drives, managing the plurality of tape drives and comprising a plurality of EKMs embodied in the controller, each EKM generating encryption keys for encryption enabled tape drives, and a non-transitory computer readable storage medium storing a computer readable program that when executed by a processor causes the processor to perform the steps of:
   identifying an EKM of the plurality of EKMs;
   establishing communication with the EKM by modifying a configuration file with a new entry comprising an EKM alias name and an EKM IP address;
   simulating a simulated encryption enabled tape drive by creating a simulated device address and a simulated device identifier;
   mapping the simulated device address and the simulated device identifier to a logical address;
   requesting an encryption key from the EKM using the logical address; and
   verifying that there is a valid encryption key path to the EKM by receiving a valid encryption key from the EKM at the logical address.

2. The apparatus of claim 1, the computer readable program further causing the processor to perform the step of generating a health check report with a status of each of the plurality of EKMs.

3. The apparatus of claim 1, the computer readable program further causing the processor to perform the step of validating that the EKM can exchange encryption keys with the simulated encryption enabled tape drive.

4. The apparatus of claim 1, the computer readable program further causing the processor to perform the step of validating that the EKM can certify an authenticity of the simulated encryption enabled tape drive by validating a unique certificate provided by the simulated encryption enabled tape drive.

5. The apparatus of claim 1, the computer readable program further causing the processor to perform the step of requesting the encryption key by loading a scratch volume to a first encryption enabled tape drive.

6. A computer program product comprising a non-transitory computer readable storage medium storing a computer readable program, wherein the computer readable program when executed on a controller causes the controller to perform the steps of:
   identifying an EKM of a plurality of EKMs embodied in the controller, each EKM generating encryption keys for encryption enabled tape drives and wherein the controller is distinct from and manages the encryption enable tape drives;
   establishing communication with the EKM by modifying a configuration file with a new entry comprising an EKM alias name and an EKM IP address;
   simulating a simulated encryption enabled by creating a simulated device address and a simulated device identifier;
   mapping the simulated device address and the simulated device identifier to a logical address;
   requesting an encryption key from the EKM using the logical address; and
   verifying that there is a valid encryption key path to the EKM by receiving a valid encryption key from the EKM at the logical address.

7. The computer program product of claim 6, the computer readable program further causing the controller to perform the step of generating a health check report with a status of each of the plurality of EKMs.

8. The computer program product of claim 6, the computer readable program further causing the controller to perform the step of validating that the EKM can exchange encryption keys with the simulated encryption enabled tape drive.

9. The computer program product of claim 6, the computer readable program further causing the controller to perform the step of validating that the EKM can certify an authenticity of the simulated encryption enabled tape drive by validating a unique certificate provided by the simulated encryption enabled tape drive.

10. The computer program product of claim 6, the computer readable program further causing the controller to perform the step of requesting the encryption key by loading a scratch volume to a first encryption enabled tape drive.

11. The computer program product of claim 6, the computer readable program further causing the controller to perform the step of identifying the plurality of EKMs by reading an alias name and an IP address for each EKM from a data set.

12. The computer program product of claim 11, the computer readable program further causing the controller to perform the step of establishing communication with the EKM by modifying a configuration file with a new entry comprising the alias name and the IP address of the EKM.

13. The computer program product of claim 12, wherein the configuration file is selected from a device driver proxy file and a controller driver file.

14. A system to check the health of EKM, the system comprising:
a plurality of tape drives storing data encrypted with an encryption key; and
a controller distinct from the plurality of tape drives, managing the plurality of tape drives, in communication with the plurality of tape drives and comprising a plurality of EKMs each providing encryption keys and embodied in the controller, the controller identifying each EKM of the plurality of EKMs, establishing communication with each EKM by modifying a configuration file with a new entry comprising an EKM alias name and an EKM IP address, simulating a simulated encryption enabled tape drive by creating a simulated device address and a simulated device identifier, mapping the simulated device address and the simulated device identifier to a logical address, requesting an encryption key from each EKM using the logical address, verifying that there is a valid encryption key path to each EKM by receiving a valid encryption key from each EKM at the logical address, and generating a health check report with a status of each of the plurality of EKMs.

15. The system of claim 14, the controller further validating that each EKM can exchange encryption keys with the simulated encryption enabled tape drive.

16. The system of claim 14, the controller further validating that each EKM can certify an authenticity of the simulated encryption enabled tape drive by validating a unique certificate provided by the simulated encryption enabled tape drive.

17. The system of claim 14, wherein the controller requests the encryption key by using a request selected from simulating an encryption enabled tape drive and loading a scratch volume to a first encryption enabled tape drive.

18. A method for deploying computer infrastructure, comprising integrating a computer-readable program stored on a non-transitory computer readable storage medium into a controller, wherein the computer-readable program when executed by the controller causes the controller to perform the following:
identifying, by the controller, an EKM of a plurality of EKMs by reading an alias name and an IP address for each EKM from a data set, wherein the controller comprises the plurality of EKMs embodied in the controller and is distinct from a plurality of tape drives and manages the plurality of tape drives;
establishing, by the controller, communication with the EKM by modifying a configuration file with a new entry comprising the alias name and the IP address of the EKM;
simulating, by the controller, a simulated encryption enabled tape drive by creating a simulated device address and a simulated device identifier;
mapping, by the controller, the simulated device address and the simulated device identifier to a logical address at the controller;
requesting, by the controller, an encryption key from the EKM using the logical address;
verifying, by the controller, that there is a valid encryption key path to the EKM by receiving a valid encryption key from the EKM at the logical address;
validating, by the controller, that the EKM can exchange encryption keys with a tape drive; and
generating, by the controller, a health check report with a status of each of the plurality of EKMs.

19. The apparatus of claim 1, wherein the configuration file is a device driver proxy file.

20. The controller of claim 14, wherein the configuration file is a device driver proxy file.

\* \* \* \* \*